US008582477B2

(12) United States Patent
Usuda et al.

(10) Patent No.: US 8,582,477 B2
(45) Date of Patent: Nov. 12, 2013

(54) TRANSMISSION RATE CONTROL METHOD, MOBILE STATION AND RADIO BASE STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 960 days.

(21) Appl. No.: 11/909,954

(22) PCT Filed: Mar. 29, 2006

(86) PCT No.: PCT/JP2006/306538
§ 371 (c)(1),
(2), (4) Date: Jan. 18, 2008

(87) PCT Pub. No.: WO2006/104209
PCT Pub. Date: Oct. 5, 2006

(65) Prior Publication Data
US 2008/0192635 A1    Aug. 14, 2008

(30) Foreign Application Priority Data
Mar. 29, 2005   (JP) ................. 2005-127062

(51) Int. Cl.
*H04B 7/005*   (2006.01)
*H04W 4/00*   (2009.01)

(52) U.S. Cl.
USPC ........................................ 370/278; 370/329

(58) Field of Classification Search
None
See application file for complete search history.

(56) References Cited

U.S. PATENT DOCUMENTS

| 2002/0060996 | A1* | 5/2002 | Kwak et al. ............... 370/335 |
| 2004/0174846 | A1* | 9/2004 | Kwon et al. .............. 370/328 |
| 2004/0203448 | A1* | 10/2004 | Nagata ................. 455/67.11 |
| 2004/0218533 | A1* | 11/2004 | Kim et al. ............... 370/235 |
| 2005/0111379 | A1* | 5/2005 | Kim et al. ............... 370/252 |
| 2005/0237932 | A1* | 10/2005 | Liu ........................ 370/230 |
| 2007/0206623 | A1* | 9/2007 | Tiedemann et al. ........ 370/431 |
| 2009/0245101 | A1* | 10/2009 | Kwon et al. .............. 370/226 |

FOREIGN PATENT DOCUMENTS

| JP | 2004215276 A | 7/2004 |
| JP | 2004-328652 | 11/2004 |
| JP | 2005-039722 | 2/2005 |
| JP | 2006-081126 | 3/2006 |
| KR | 20020011557 A | 2/2002 |
| WO | WO 00/42804 A1 | 7/2000 |
| WO | 2005125259 A1 | 12/2005 |

OTHER PUBLICATIONS

Samsung:"EUL Scheduling:signalling support" 3GPP TSG RAN WG1 #38 BIS,XX,XX,Sep. 20, 2004,pp. 1-7,XP002366790.

(Continued)

*Primary Examiner* — Eunsook Choi
(74) *Attorney, Agent, or Firm* — Marvin A. Motsenbocker; Mots Law, PLLC

(57) ABSTRACT

The present invention enables, in a mobile communication system using "EUL", to enhance radio quality by certainly allocating hardware resources at a radio base station. A transmission rate control method according to the present invention includes a step of transmitting, from the radio base station to a mobile station, an RGCH for instructing to increase the transmission rate of uplink user data, only when the radio base station has successfully received the uplink user data transmitted from the mobile station.

3 Claims, 6 Drawing Sheets

(56) References Cited

OTHER PUBLICATIONS

3GPP TS 25.309 V6.2.0 (Mar. 2005), Technical Specification, 3rd Generation Partnership Project; Technical Specification Group Radio Access Network; FDD Enhanced Uplink; Overall description; Stage 2, (Release 6), p. 1-p. 30.

3GPP TSG; "Setting of Serving Grant with E-HICH Acknowledgment"; 3GPP TSG-RAN 2 #48; London, 12.2, O.1.5; 4 pages; (Aug. 29-Sep. 2, 2005) (Cited in the counterpart international search report).

The office communication of Dec. 12, 2011, issued in the counterpart Indian patent application.

* cited by examiner

TRANSMISSION RATE CONTROL METHOD, MOBILE STATION AND RADIO BASE STATION

TECHNICAL FIELD

The present invention relates to a transmission rate control method, a mobile station and a radio base station, which controls a transmission rate of uplink user data.

BACKGROUND ART

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 11, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 12(a), the data are transmitted by accepting low-speed, high-delay, and low-transmission efficiency as shown in FIG. 12(b), or, as shown in FIG. 12(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIG. 12.

Therefore, the 3 rd Generation Partnership Project (3GPP) and the 3 rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

As shown in the non-patent document 1, a conventional mobile communication system using "EUL" is configured to; increase a transmission rate of uplink user data when the mobile station UE has received a Relative rate Control Channel (RGCH) from a radio base station Node B. The RGCH indicates that the transmission rate of uplink user data should be increased (including "Up" command).

Further, as shown in the non-patent document 1, HARQ scheme has been adopted to the conventional mobile communication system using the "EUL". Therefore, the radio base station Node B is configured to; transmit an affirmative transmission acknowledgement signal (Ack) to the mobile station whenever the reception and decoding process for each transmission data block forming the uplink user data has been successful, and to transmit a negative transmission acknowledgement signal (Nack) to the mobile station when the reception and decoding process for the transmission data block has not been successful.

The mobile station UE is configured to repeat transmitting the same transmission data block until the mobile station UE receives an affirmative transmission acknowledgement signal (Ack) or until the number of transmission reaches the maximum number of retransmission determined by the radio network controller RNC.

Here, when the "Up" command has been received through the RGCH, the mobile station UE is configured to increase the transmission rate of uplink user data, regardless of the "Ack/Nack/DTX" signal transmitted through an HICH.

In addition, the radio base station Nod B is configured to determine increase/decrease of the transmission rate of uplink user data, regardless of the reception and decoding process result of the transmission data block, so as to notify the determined result (ie., the "Up" command or the "Down" command) to the mobile station UE through the RGCH.

However, in the conventional mobile communication system using "EUL", there has been a problem that the radio base station Node B may not be able to allocate necessary hardware resources for performing reception and decoding process for the retransmitted transmission data block, when a transmission rate of uplink user data transmitted from the mobile station UE has increased regardless of the negative transmission acknowledgement signal (Nack) transmitted from the radio base station Node B.

(Non-patent Document 1) 3GPP TSG-RAN TS-25.309 v6.2.0

DISCLOSURE OF THE INVENTION

The present invention has been made considering the above-described problems, and its object is to provide, in the conventional mobile communication system using "EUL", a transmission rate control method, a mobile station and a radio base station that make it possible to enhance radio quality by certainly allocating hardware resources at the radio base station.

A first aspect of the present invention is summarized as a transmission rate control method for controlling a transmission rate of uplink user data, including: transmitting, from a radio base station to a mobile station, a relative rate control channel for instructing to increase the transmission rate of the uplink user data, only when the radio base station has successfully received the uplink user data transmitted from the mobile.

In the first aspect of the present invention, the transmission rate control method may include; increasing, at the mobile station, the transmission rate of the uplink user data in accordance with the relative rate control channel for instructing to increase the transmission rate of the uplink user data, only when the mobile station has received an affirmative transmission acknowledgement signal transmitted from the radio base station.

A second aspect of the present invention is summarized as a mobile station for transmitting uplink user data, including: a transmission rate control section configured to increase a transmission rate of the uplink user data in accordance with a relative rate control channel for instructing to increase the transmission rate of the uplink user data, only when the mobile station has received an affirmative transmission acknowledgement signal from a radio base station.

A third aspect of the present invention is summarized as a radio base station used in a transmission rate control method for controlling a transmission rate of uplink user data, including: a relative rate control channel transmission section configured to transmit, to a mobile station, a relative rate control channel for instructing to increase the transmission rate of the uplink user data, only when the radio base station has successfully received the uplink user data transmitted from the mobile station,

BRIEF DESCRIPTION OF THE DRAWINGS

FIG. 1 is a functional block diagram of a mobile station of a mobile communication system according to the first embodiment of the present invention.

FIG. 2 is a functional block diagram of a baseband signal processing section in a mobile station of the mobile communication system according to the first embodiment of the present invention.

FIG. 3 is a functional block diagram of a MAC-e processing section of the baseband signal processing section, in a mobile station of the mobile communication system according to the first embodiment of the present invention.

FIG. 4 is a functional block diagram of a radio base station of the mobile communication system according to the first embodiment of the present invention.

FIG. 5 is a functional block diagram of a baseband signal processing section in a radio base station of the mobile communication system according to the first embodiment of the present invention.

FIG. 6 is a functional block diagram of a MACE and Layer-1 processing section (configuration for uplink), in the baseband signal processing section of a radio base station of the mobile communication system according to the first embodiment of the present invention.

FIG. 7 is a functional block diagram of a MAC-e functional section of the MAC-e and Layer-1 processing section (configuration for uplink), in the baseband signal processing section in a radio base station of the mobile communication system according to the first embodiment of the present invention.

FIG. 8 is a functional block diagram of a radio network controller of the mobile communication system according to the first embodiment of the present invention.

FIG. 9 is a flowchart showing an operation of a radio base station of the mobile communication system according to the first embodiment of the present invention.

FIG. 10 is a flowchart showing an operation of a mobile station of the mobile communication system according to the first embodiment of the present invention.

FIG. 11 is a diagram showing an entire configuration of a general mobile communication system.

FIGS. 12(a) to 12(c) are graphs illustrating operations at the time of burst data transmission in a conventional mobile communication system.

BEST MODE FOR CARRYING OUT THE INVENTION (Mobile Communication System According to First Embodiment of the Present Invention)

A description will be given of a configuration of a mobile communication system according to a first embodiment of the present invention with reference to FIGS. 1 to 8.

Figure 11:
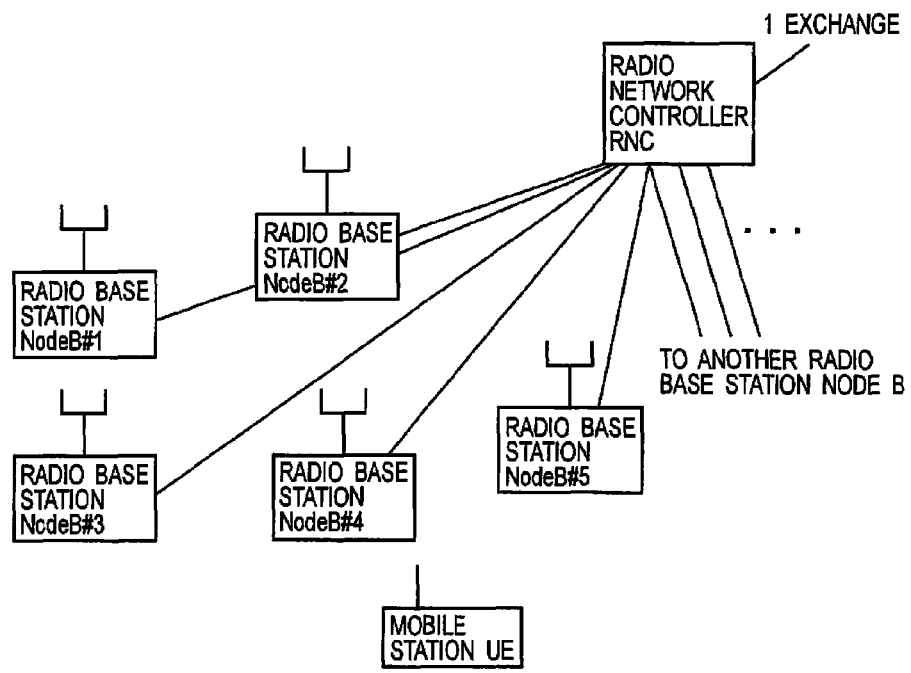
[FIG. 11]
Figure 12:
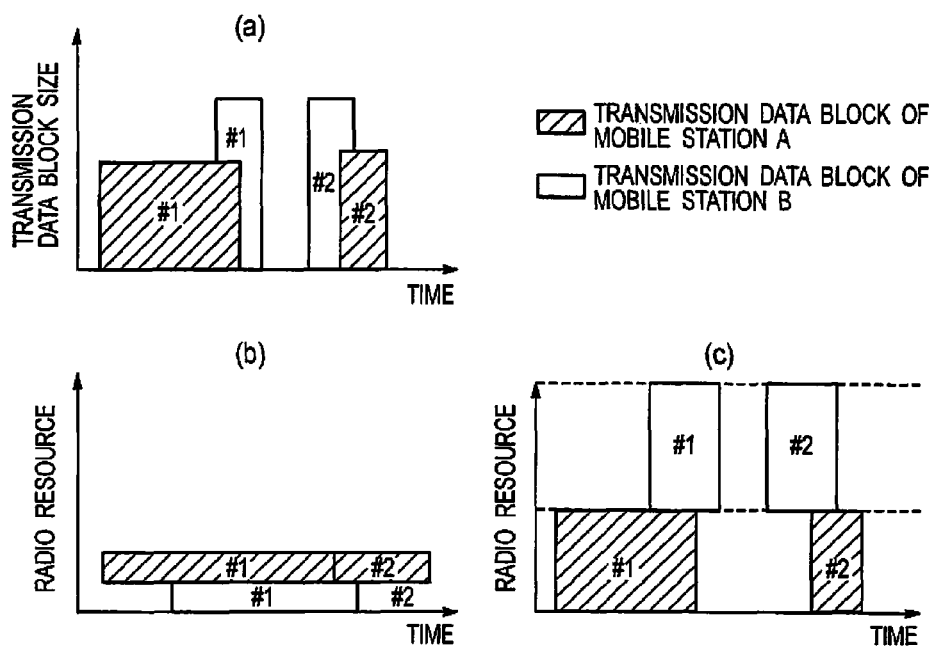
[FIG. 12]

As shown in FIG. 11, the mobile communication system according to the present embodiment comprises a plurality of radio base stations Node B #1 to #5, and a radio network controller RNC.

In addition, in the mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, an Enhanced Dedicated Physical Channel (E-DPCH), configured of an Enhanced Dedicated Physical Data Channel (E-DPDCH) and an Enhanced Dedicated Physical Control Channel (E-DPCCH), and a Dedicated Physical Channel (DCPH), configured of a Dedicated Physical Data Channel (DPDCH) and a Dedicated Physical Control Channel (DPCCH), are used in the uplink.

Here, the E-DPCCH transmits control data for the EUL such as a transmission format number for defining a transmission format (transmission block size, or the like) of the E-DPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol used for RAKE combining, SIR measurement, or the like, a Transport Format Combination Indicator (TFCI) for identifying a transmission format of uplink DPDCH, and a transmission power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" and a "Random Access Channel (RACH)", which are needed when the HSPDA is applied, are also used.

The HS-DPCCH transmits a Channel Quality Indicator (CQI) in a downlink and an acknowledge signal (Ack or Nack) for the HS-DPCCH.

Figure 1:
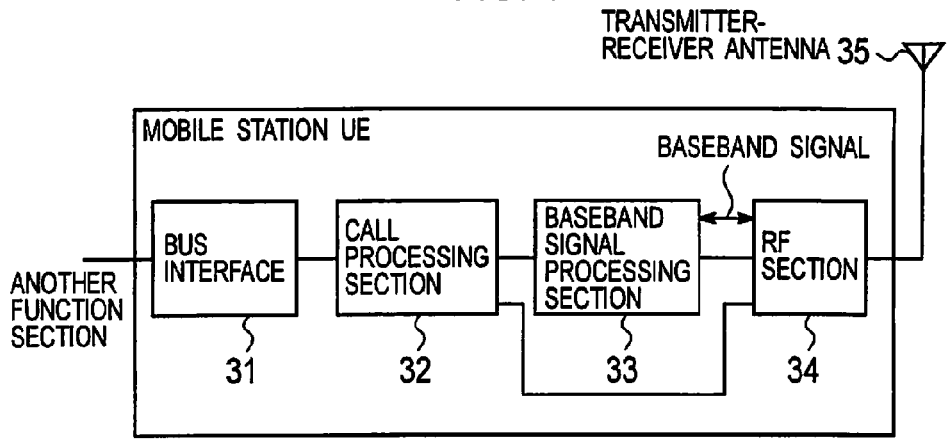
[FIG. 1]

As shown in FIG. 1, the mobile station UE according to this embodiment is provided with a bus interface 31, a call processing section 32, a baseband processing section 33, a radio frequency (RF) section 34, and a transmission—reception antenna 35.

However, these functions can be independently present as a hardware, and can be partly or entirely integrated, or can be configured through a process of software.

The bus interface 31 is configured to forward user data output from the call processing section 32 to another functional section (for example, an application related functional section). In addition, the bus interface 31 is configured to forward user data transmitted from another functional section (for example, the application related functional section) to the call processing section 32.

The call processing section 32 is configured to perform a call control processing for transmitting and receiving user data.

The baseband signal processing section 33 is configured to transmit, to the call processing section 32, the user data acquired by performing, against the baseband signals transmitted from the RF section 34, a layer-1 processing, a "Media Access Control (MAC)" processing, and a "Radio Link Control (RLC)" processing. The layer-1 processing includes a despreading processing, a RAKE combining processing and an "Forward Error Correction (FEC)" decode processing. The "Media Access Control (MAC)" processing includes a MAC-e processing and a MAC-d processing.

In addition, the baseband signal processing section 33 is configured to generate the baseband signals by performing the RLC processing, the MAC processing, or the layer-1 processing against the user data transmitted from the call processing section 32 so as to transmit the generated baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission—reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 2:
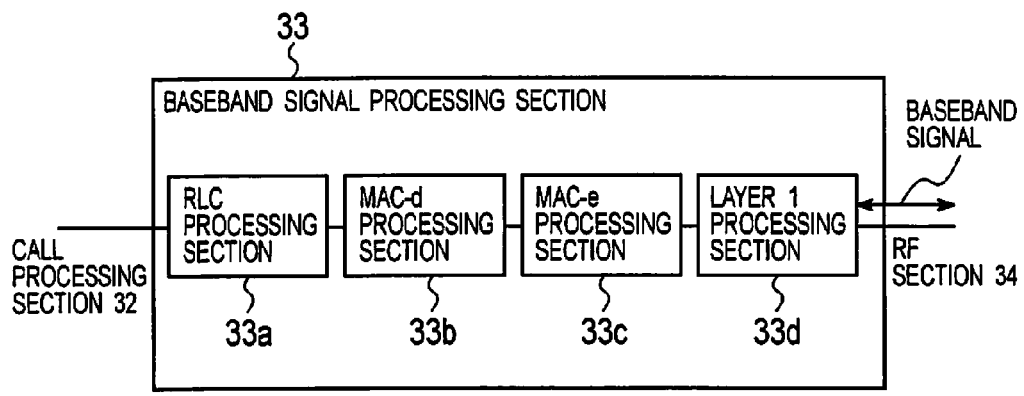
[FIG. 2]

As shown in FIG. 2, the baseband signal processing section 33 is provided with a RLC processing section 33a, a MAC-d processing section 33b, a MAC-E processing section 33c, and a layer-1 processing section 33d.

The RLC processing section 33a is configured to perform a processing (RLC processing) in an upper layer of a layer-2, against the user data transmitted from the call processing section 32, so as to transmit the user data to the MAC-d processing section 33b.

The MAC-d processing section 33b is configured to grant a channel identifier header, and to create a transmission format in the uplink based on the limitation of transmission power in the uplink.

Figure 3:
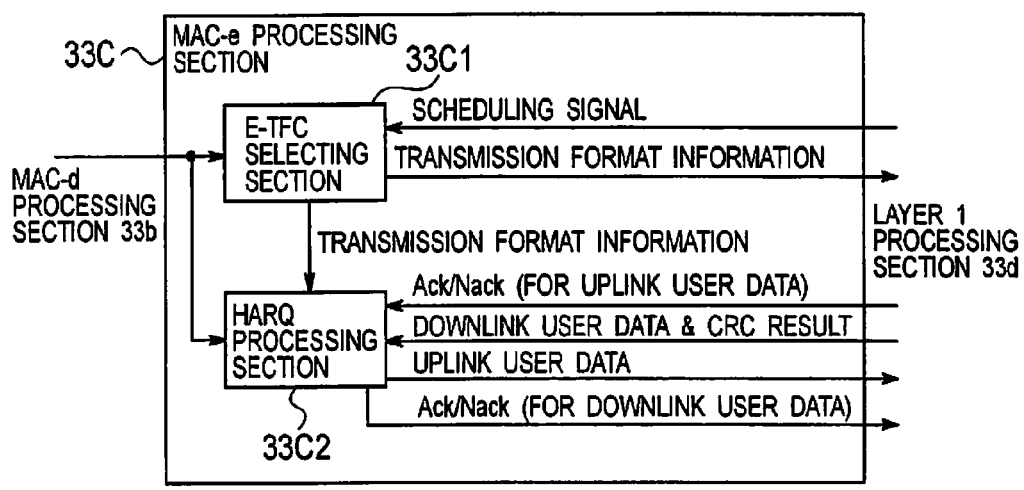
[FIG. 3]

As shown in FIG. 3, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and the E-DPCCH, based on scheduling signals (RGCH, and the like) transmitted from the radio base station Node B.

In addition, the E-TFC selecting section 33c1 is configured to transmit transmission format information on the determined transmission format (that is, a transmission data block size, a transmission power ratio between the E-DPDCH and the DPCCH, or the like) to the layer-1 processing section 33d, and also to transmit the determined transmission format information to the HARQ processing section 33c2.

The E-TFC selection section 33c1 is configured to increase the transmission rate of uplink user data in accordance with the RGCH for instructing to increase the transmission rate of the uplink user data that should be transmitted in the following step (i.e. including "Up" command), only when the E-TFC selection section 33c1 has received, from the radio base station Node B, an affirmative transmission acknowledgement signal (Ack) against the transmission data block, which configures uplink user data transmitted in the preceding step.

Such scheduling signals are information that is notified in the cell where the mobile station UE is located, and includes control information for all the mobile stations located in the cell, or a specific group of the mobile stations located in the cell.

The HARQ processing section 33c2 is configured to perform process control for the "stop-and-wait of N-process", so as to transmit the user data in the uplink based on an acknowledge signal (Ack/Nack for uplink data) transmitted from the radio base station Node B.

Specifically, the HARQ processing section 33c2 is configured to determine whether or not the receive processing of downlink user data has been successful based on the result of the "Cyclic Redundancy Check (CRC)" entered from the layer-1 processing section 33d.

Then, the HARQ processing section 33c2 generates an acknowledge signal (Ack/Nack for downlink user data) based on the determined result, so as to transmit the generated acknowledge signal to the layer-1 processing section 33d.

In addition, when the above-described determination result has been successful, the HARQ processing section 33c2 transmits, the downlink user data entered from the layer-1 processing section 33d to the MAC-d processing section 33b.

Figure 4:
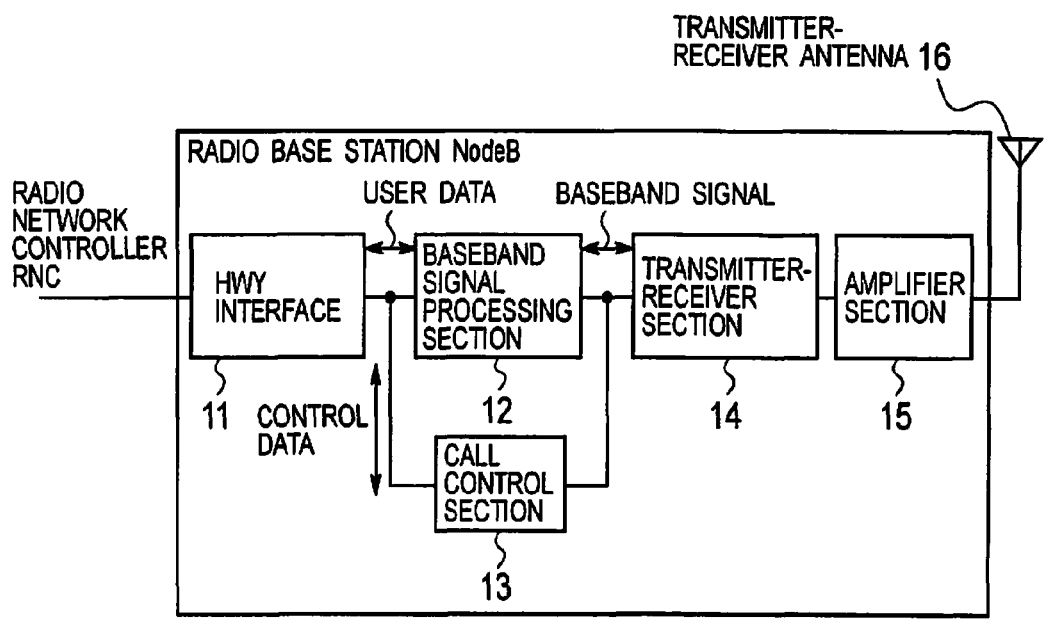
[FIG. 4]

As shown in FIG. 4, the radio base station Node B according to this embodiment is provided with an HWY interface 11, a baseband signal processing section 12, a call control section 13, at least one transmitter-receiver section 14, at least one amplifier section 15, and at least one transmission—reception antenna 16.

The HWY interface 11 is an interface to a radio network controller RNC. Specifically, the HWY interface 11 is configured to receive user data transmitted from the radio network controller RNC to a mobile station UE via a downlink, so as to enter the received user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which is received from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the RLC processing, the MAC processing (the MAC-d processing and the MAC-e processing), or the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like. In addition, the layer-1 processing in the downlink includes a channel coding processing of user data, a spreading processing, or the like.

In addition, the baseband signal processing section 12 is configured to extract user data by performing the layer-1 processing, the MAC processing (the MAC-e processing and the MAC-d processing), or the RLC processing against the baseband signals acquired from the transmitter-receiver section 14, so as to forward the extracted user data to the HWY interface 11.

Here, the MAC processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later. In addition, the call control section 13 is configured to perform the call control processing, based on the control data acquired from the HWY interface 11.

The transmitter-receiver section 14 is configured to perform processing of converting baseband signals, which are acquired from the baseband signal processing section 12, to radio frequency signals (downlink signals), so as to transmit the converted radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE via the transmission—reception antenna 16. In addition, the amplifier 15 is configured to amplify the uplink signals received by the transmission—reception antenna 16, so as to transmit the amplified uplink signals to the transmitter-receiver section 14.

Figure 5:
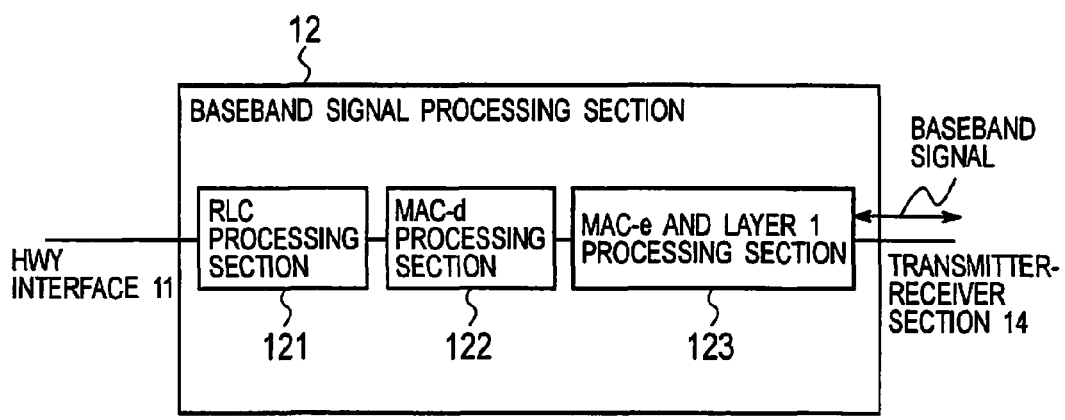
[FIG. 5]

As shown in FIG. 5, the baseband signal processing section 12 is provided with an RLC processing section 121, a MAC-d processing section 122, and a MAC-e and layer 1 processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

The MAC-d processing section 122 is configured to perform a disposal processing of header against output signals transmitted from the MAC-e and layer-1 processing section 123.

The RLC processing section 121 is configured to perform, against the output signals transmitted from the MAC-d processing section 122, the retransmission control processing in the RLC layer or the reestablishment processing of RLC-Service Data Section (SDU).

However, these functions are not clearly divided per hardware, and can be acquired by software.

Figure 6:
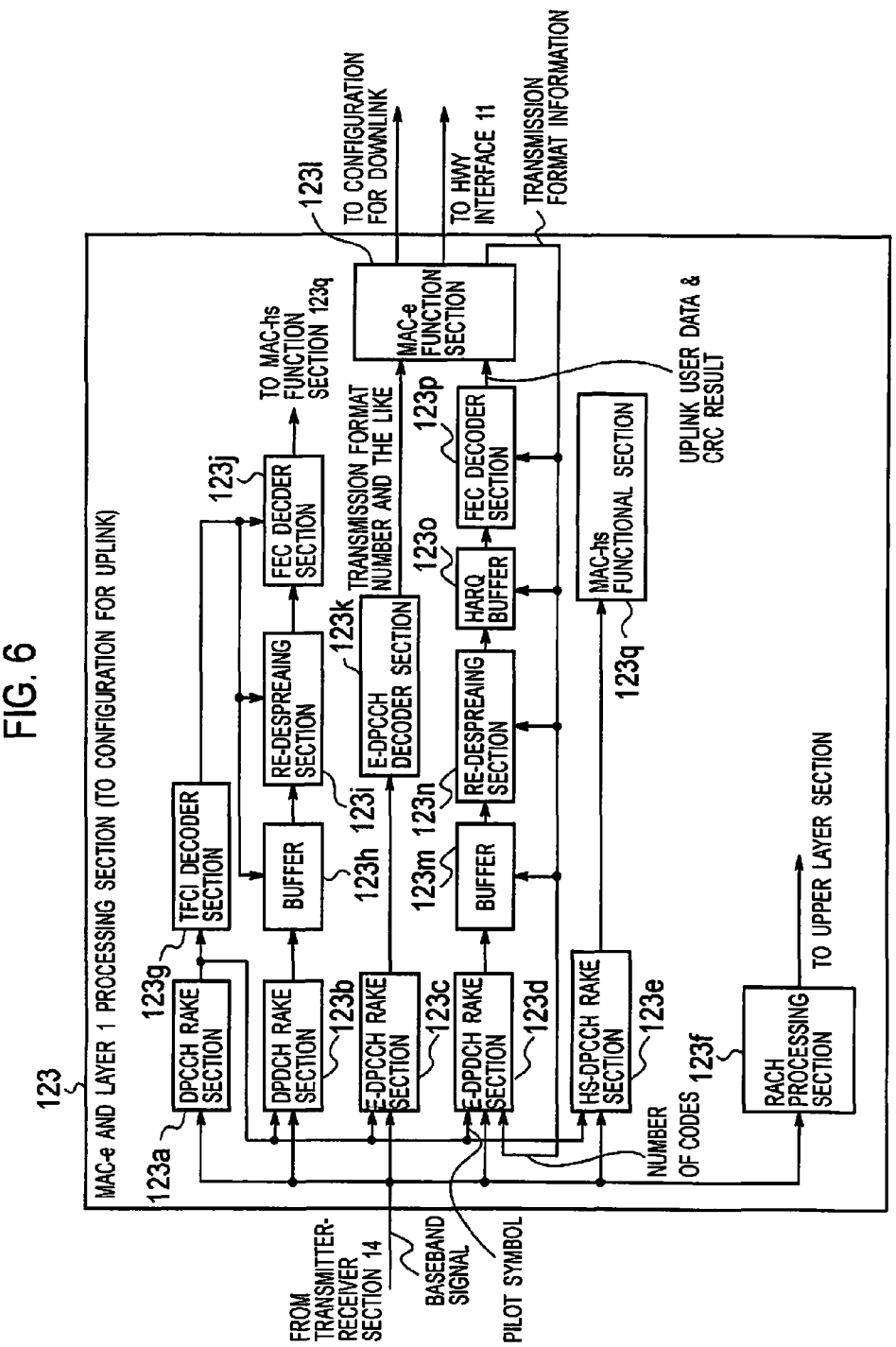
[FIG. 6]

As shown in FIG. 6, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, an RACH processing section 123f, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q.

The E-DPCCH RAKE section 123c is configured to perform, against the E-DPCCH in the baseband signals transmitted from the transmitter-receiver section 14, the despreading processing and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the acquired information to the MAC-e functional section 123l.

The E-DPDCH RAKE section 123d is configured to perform, against the E-DPDCH in the baseband signals transmitted from the transmitter-receiver section 14, the despreading processing using the transmission format information (the number of codes) transmitted from the MAC-e functional section 123l, and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform the despreading processing against the RAKE combining outputs of the E-DPDCH RAKE section 123d stored in the buffer 123m, based on the transmission format information (spreading factor) transmitted from the MAC-e functional section 123l.

The HARQ buffer 123o is configured to store the despreading processing outputs of the re-despreading section 123n, based on the transmission format information transmitted from the MAC-E functional section 123l.

The FEC decoder section 123p is configured to perform an error correction decoding processing (the FEC decoding processing) against the despreading processing outputs of the re-despreading section 123n, which is stored in the HARQ buffer 123o, based on the transmission format information (transmission data block size) transmitted from the MAC-e functional section 123l.

The MAC-E functional section 123l is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123k.

Figure 7:
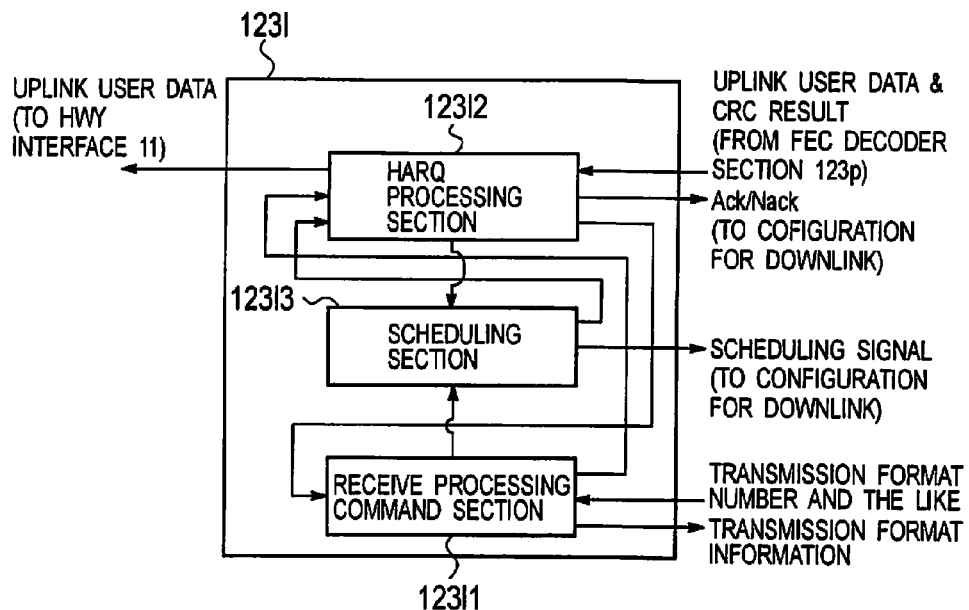
[FIG. 7]

In addition, as shown in FIG. 7, the MAC-e functional section 123l is provided with a receive processing command section 123l1, an HARQ processing section 123l2, and a scheduling section 123l3.

The receive processing command section 123l1 is configured to transmit the transmission format number related information, the HARQ related information, and the scheduling related information, which are entered from the E-DPCCH decoder section 123k, to the HARQ processing section 123l2.

In addition, the receive processing command section 123/1 is configured to transmit, to the scheduling section 123/3, the scheduling related information entered from the E-DPCCH decoder 123k.

Further, the receive processing command section 123/1 is configured to output the transmission format information corresponding to the transmission format number entered from the E-DPCCH decoder section 123k.

The HARQ processing section 123/2 is configured to determine whether or not the receive processing of uplink user data has been successful, based on the CRC result entered from the FEC decoder section 123p. Then, the HARQ processing section 123/2 generates an acknowledge signal (Ack or Nack) based on the determination result, so as to transmit the generated acknowledge signal to the configuration for the downlink of the baseband signal processing section 12.

In addition, the HARQ processing section 123/2 is configured to transmit the uplink user data entered from the FEC decoder section 123p to the radio network controller RNC, when the above determination result has been successful.

In addition, the HARQ processing section 123/2 is configured to clear soft decision values stored in the HARQ buffer 123o, when the above determination result has been successful.

On the other hand, when the above determination result has not been successful, the HARQ processing section 123/2 is configured to store the uplink user data in the HARQ buffer 123o.

In addition, the HARQ processing section 123/2 is configured to forward the above determination result to the receive processing command section 123/1. The receive processing control command section 123/1 is configured to notify the E-DPDCH RAKE section 123d and the buffer 123m of an hardware resource that should be prepared for the following transmission time interval (TTI), so as to perform notification for reserving the resource in the HARQ buffer 123o.

In addition, when uplink user data for the buffer 123m or the FEC decoder section 123p is stored in the buffer 123m per TTI, the receive processing command section 123/1 is configured to instruct the HARQ buffer 123o and the FEC decoder section 123p to perform the FEC decoding processing after adding the uplink user data, which is stored in the HARQ buffer 123o and is performed in a process corresponding to the TTI, and a newly received uplink user data.

The scheduling section 123/3 is configured to transmit a scheduled signal (RGCH and the like) through a configuration for the downlink.

Further, the scheduling section 123/3 is configured to transmit, to the mobile station UE, the RGCH for instructing to increase the transmission rate of uplink user data that should be transmitted in the following step (including "Up" command) only when the reception and decoding process for each transmission data block has been successful. Here, each transmission data block forms the uplink user data transmitted from the mobile station UE in the preceding step.

The radio network controller RNC according to the present embodiment is an apparatus located on upper level of the radio base station Node B and configured to control radio communication between the radio base station Node B and the mobile station UE.

Figure 8:
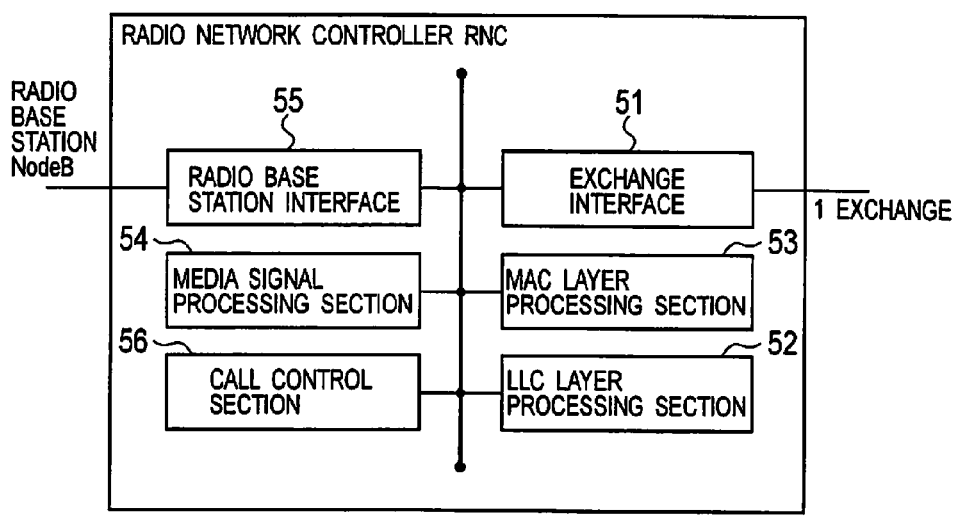
[FIG. 8]

As shown in FIG. 8, the radio network controller RNC according to this embodiment is provided with an exchange interface 51, a Logical Link Control (LLC) layer processing section 52, a MAC layer processing section 53, a media signal processing section 54, a radio base station interface 55, and a call control section 56.

The exchange interface 51 is an interface with an exchange 1. The exchange interface 51 is configured to forward the downlink signals transmitted from the exchange 1, to the LLC layer processing section 52. Further, the exchange interface 51 is configured to forward the uplink signals transmitted from the LLC layer processing section 52 to the exchange 1.

The LLC layer processing section 52 is configured to perform an LLC sub-layer processing such as a synthesis processing of a header or a trailer. The header includes such as a sequence number, or the like.

The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing.

The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface to the radio base station Node B. The radio base station interface 55 is configured to forward the uplink signals transmitted from the radio base station Node B, to the MAC layer processing section 53 (or the media signal processing section 54). Further, the radio base station interface 55 is configured to forward the downlink signals transmitted from the MAC layer processing section 53 (or the media signal processing section 54), to the radio base station Node B.

The call control section 56 is configured to perform a radio resource control processing, a channel setup by the layer-3 signaling, open processing by the layer-3 signaling, or the like. Here, the radio resource control processing includes a call admission control processing, a handover processing, or the like.

Figure 9:
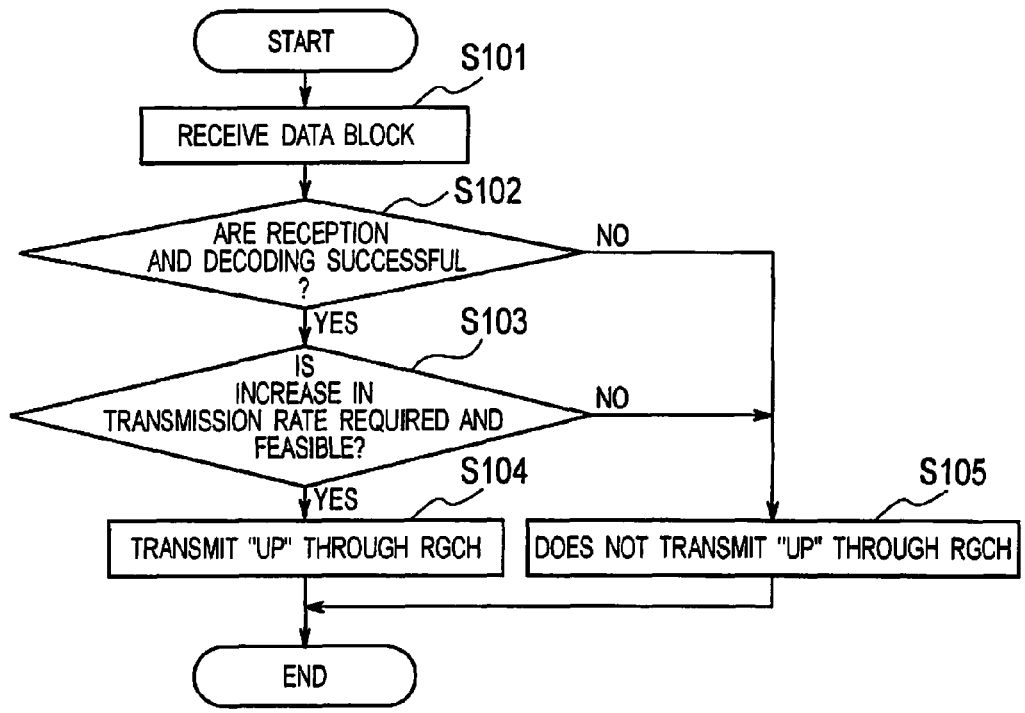
[FIG. 9]
Figure 10:
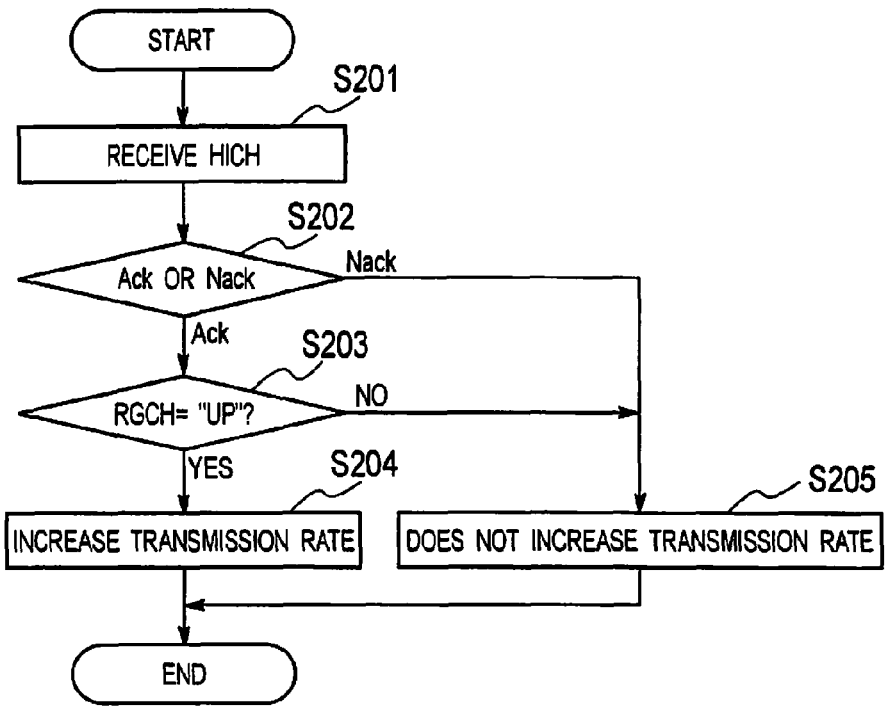
[FIG. 10]

With reference to FIGS. 9 and 10, the operation of the mobile communication system according to the first embodiment of the present invention will be described. FIG. 9 shows the operation of the radio base station Node B according to the first embodiment, and FIG. 10 shows the operation of the radio base station Node B according to the first embodiment.

As shown in FIG. 9, in step S101, the radio base station Nod B receives a transmission data block forming uplink user data transmitted from the mobile station UE.

In steps S102 and S103, when the reception and decoding process for the transmission data block has been successful, and increase of the transmission rate of uplink user data is required and feasible, in step S104, the radio base station Node B transmits an RGCH, which includes "Up" command.

On the other hand, in steps S102 and S103, when the reception and decoding process for the transmission data block has not been successful, or, increase of the transmission rate of uplink user data is not required or not feasible, in step S105, the radio base station Node B does not transmit an RGCH, which includes "Up" command.

As shown in FIG. 10, in step S201, the mobile station UE receives an HICH.

In steps S202 and S203, when an affirmative transmission acknowledgement signal (Ack) has been received through the HICH and the received RGCH includes "Up" command, in step S204, the mobile station UE increases the transmission rate of the uplink user data.

On the other hand, in steps S202 and S203, when a negative transmission acknowledgement signal (Nack) has been received the through HICH or the received RGCH does not include "Up" command, in step S205, the mobile station UE does not increase the transmission rate of uplink user data.

Although the present invention has been described in detail above with the embodiment, it is apparent to those skilled in the art that the present invention is not limited to the embodiment described in the present application. The present invention can be implemented as altered and modified embodiments without departing from the spirit and scope of the present invention as defined by the description of claims. Therefore, the description of the present application is for illustrative purposes and is not intended to limit the present invention in any way.

[Industrial Applicability]

As described above, the present invention can provide, in a mobile communication system using "EUL", a transmission rate control method, a mobile station and a radio base station that makes it possible to enhance radio quality by certainly allocating hardware resources at the radio base station.

The invention claimed is:

1. A mobile station for transmitting uplink user data, comprising:
a transmission rate control section configured to increase a transmission rate of the uplink user data for a target HARQ process in accordance with a relative rate control channel for instructing to increase the transmission rate of the uplink user data, triggered by an affirmative transmission acknowledgement signal received from a radio base station via a transmission acknowledgement signal transmitting channel after the reception of the relative rate control channel, the transmission acknowledgement signal transmitting channel being different from the relative rate control channel, and the target HARQ process being a HARQ process in which an acknowledgment signal and a relative rate control signal are received.

2. A mobile station for transmitting uplink user data, comprising:
a transmission rate control section configured to increase a transmission rate of the uplink user data for a target HARQ process in accordance with a relative rate control channel for instructing to increase the transmission rate of the uplink user data triggered by an affirmative transmission acknowledgement signal received from a radio base station via a transmission acknowledgement signal transmitting channel after the reception of relative rate control channel, the transmission acknowledgement signal transmitting channel being different from the relative rate control channel, but not when the mobile station does not receive an affirmative transmission acknowledgement signal from the radio base station, the target HARQ process being a HARQ process in which an acknowledgment signal and a relative rate control signal are received.

3. A mobile station for transmitting uplink user data, comprising:
a transmission rate control section configured to increase a transmission rate of the uplink user data for a target HARQ process in accordance with a relative rate control channel for instructing to increase the transmission rate of the uplink user data triggered by an affirmative transmission acknowledgement signal received from a radio base station via a transmission acknowledgement signal transmitting channel after the reception of the relative rate control channel, the transmission acknowledgement signal transmitting channel being different from the relative rate control channel, but not when the mobile station receives a negative transmission acknowledgement signal from the radio base station, the target HARQ process being a HARQ process in which an acknowledgment signal and a relative rate control signal are received.

* * * * *